United States Patent
Looije

(10) Patent No.: US 8,834,149 B2
(45) Date of Patent: Sep. 16, 2014

(54) MOLDING APPARATUS

(75) Inventor: Adrian Peter Looije, Aurora (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 0 days.

(21) Appl. No.: 13/639,014

(22) PCT Filed: Feb. 9, 2011

(86) PCT No.: PCT/CA2011/050070
§ 371 (c)(1),
(2), (4) Date: Oct. 2, 2012

(87) PCT Pub. No.: WO2011/130847
PCT Pub. Date: Oct. 27, 2011

(65) Prior Publication Data
US 2013/0029004 A1    Jan. 31, 2013

Related U.S. Application Data

(60) Provisional application No. 61/327,206, filed on Apr. 23, 2010.

(51) Int. Cl.
*B29C 45/40* (2006.01)
*B29L 31/56* (2006.01)
*B29C 45/33* (2006.01)

(52) U.S. Cl.
CPC ......... *B29C 45/40* (2013.01); *B29C 2045/4078* (2013.01); *B29L 2031/565* (2013.01); *B29C 2045/334* (2013.01); *B29C 45/33* (2013.01); Y10S 425/058 (2013.01)

USPC ..... 425/556; 425/411; 425/444; 425/DIG. 58

(58) Field of Classification Search
USPC ...... 425/556, DIG. 58, 441, 443, 444, DIG. 5
See application file for complete search history.

(56) References Cited

U.S. PATENT DOCUMENTS

| | | | | |
|---|---|---|---|---|
| 4,541,795 | A | * | 9/1985 | Cole ............................ 425/437 |
| 4,570,897 | A | | 2/1986 | Von Holdt |
| 4,618,121 | A | | 10/1986 | Conti |
| 4,676,732 | A | | 6/1987 | Letica |
| 4,806,301 | A | | 2/1989 | Conti |
| 5,217,731 | A | * | 6/1993 | Fallent ......................... 425/556 |

(Continued)

FOREIGN PATENT DOCUMENTS

| | | |
|---|---|---|
| CN | 101474854 A | 7/2009 |
| EP | 1905566 A1 | 2/2008 |

(Continued)

OTHER PUBLICATIONS

PCT International Search Report; Ristovski, Branka; Apr. 20, 2011; 3 pages.

(Continued)

*Primary Examiner* — Yogendra Gupta
*Assistant Examiner* — Emmanuel S Luk

(57) ABSTRACT

Disclosed herein is, amongst other things, a molding apparatus, comprising a stripper sleeve (116) for use in a first stack portion (110) of a mold stack (140), wherein the stripper sleeve (116) is configured to open a slide pair (122) of the first stack portion (110) and to strip a molded article (106) from the first stack portion (110).

18 Claims, 3 Drawing Sheets

(56) References Cited

U.S. PATENT DOCUMENTS

| | | | |
|---|---|---|---|
| 5,368,469 A * | 11/1994 | Ekkert | 425/556 |
| 5,403,179 A * | 4/1995 | Ramsey | 425/577 |
| 5,531,588 A | 7/1996 | Brun, Jr. et al. | |
| 6,287,106 B1 * | 9/2001 | Learn et al. | 425/556 |
| 6,450,797 B1 | 9/2002 | Joseph | |
| 7,128,865 B2 | 10/2006 | Martin | |
| 7,150,847 B2 | 12/2006 | Chapplear et al. | |
| 2002/0122841 A1 | 9/2002 | Joseph | |
| 2005/0136150 A1 | 6/2005 | Martin | |
| 2009/0104306 A1 | 4/2009 | Bereuter et al. | |

FOREIGN PATENT DOCUMENTS

| | | |
|---|---|---|
| WO | 8601179 A1 | 2/1986 |
| WO | 02070227 A1 | 9/2002 |
| WO | 2007101322 A1 | 9/2007 |

OTHER PUBLICATIONS

European Search Report, Apr. 14, 2014, 6 pages.

* cited by examiner

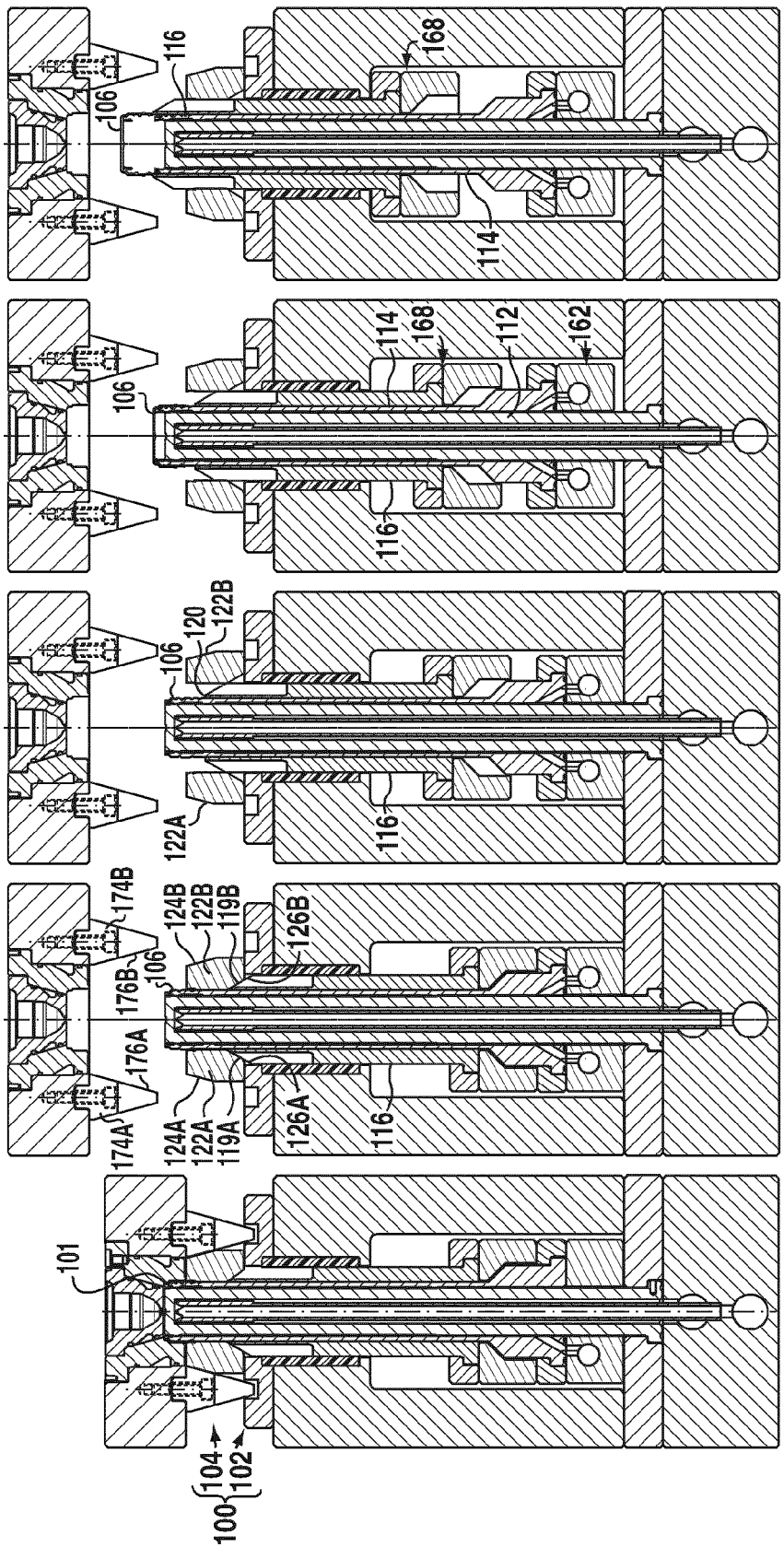

MOLDING APPARATUS

TECHNICAL FIELD

The non-limiting embodiments disclosed herein generally relate to a molding apparatus, and more particularly to an injection mold.

BACKGROUND

U.S. Pat. No. 7,150,847 to CHAPPLEAR et al., published on Dec. 19, 2006 discloses, amongst other things, a staged, sequentially separated injection mold for forming a container spout having a peripheral flange, a generally cylindrical sidewall, a removable panel fixed within the sidewall, and a pull ring connected to the removable panel. The mold includes a base, and a first element coupled to the base including a gate. A core plate movable with respect to the base, and a core element confronting the first mold element. A sleeve surrounds the core element having a channel to define the pull ring. The sleeve moves with respect to the core element to permit release of a molded pull ring. A stripper ring surrounds the sleeve with an edge positioned contiguous to the sleeve outward facing surface, the stripper ring being movable along the sleeve.

U.S. Pat. No. 7,128,865 to MARTIN, published on Oct. 31, 2006 discloses, amongst other things, an injection molding method and apparatus for ejecting a molded plastic preform from a mold. A first lifting structure and/or step is configured to have an inner surface with an area for sealing and aligning with a complementary surface on a core, and to have an upper surface with an area for sealing and aligning with a complementary surface on a second lifting structure, said upper surface of said first lifting structure being configured to lift a molded plastic preform from the injection mold in a lifting direction for a first period of time, the lower portion of the molded plastic preform lying in a plane substantially perpendicular to the lifting direction. A second lifting structure and/or step is configured to have an inner surface configured to lift an outer surface of the molded plastic preform from the injection mold in the lifting direction for a second period of time, the outer surface of the molded plastic preform including structure lying in a plane substantially parallel with the lifting direction. Since the molded plastic preform is lifted by its end, the preform does not have to be solidified at its interior, thus allowing earlier removal of the preform from the mold, reducing cycle time.

U.S. Pat. No. 6,450,797 to EALIAS, Joseph, published on Sep. 17, 2002 discloses, amongst other things, a molding apparatus has a pair of slide inserts which are laterally movable into and out of engagement with the other mold components. The lateral movement of the slide inserts is provided by a slide mechanism having a driving rack, a pair of drive pinions at either end of the driving rack, two pairs of driven racks and a plurality of slides connected to the driven racks. The driven racks of each pair are parallel and spaced from one another, engaging opposite sides of a pinion and thereby being driven in opposite directions by rotation of the pinion. The molding apparatus is more compact than conventional devices having slide inserts, eliminates the use of slide retainers, eliminates obstructions between the mold plates when the plates are separated, and can cycle faster than conventional devices.

U.S. Pat. No. 4,806,301 to CONTI, published on Feb. 21, 1989 discloses, amongst other things, a mold for forming a plastic cap and a method of removing a cap from such a mold. The mold includes female and male members which, together, form a mold cavity in which the cap is formed. The female member includes an upper assembly and a plurality of cams. The cams have radial protrusions engaging the male member to form annular recesses in the cap. The cap is removed from the mold by moving the upper assembly of the female member axially and the cams thereof radially away from the cap, and then removing the cap itself from the male member of the mold. Preferably the cap is shrunk onto the male member to develop a space between the cap and the female member of the mold prior to moving the female member away from the cap.

U.S. Pat. No. 4,676,732 to LETICA, published on Jun. 30, 1987 discloses, amongst other things, a bucket-shaped container having a rim opening smaller than the diameter of the side wall thereof is injected molded from thermoplastic material using a die set including a molding core which collapses to allow axial removal of the molded container from the mold. The molding core comprises a plurality of individual, wedge-shaped outer core sections which collectively form a continuous molding surface and are slidably mounted on a tapered inner core to allow axial sliding movement of the outer core section relative to the inner core. The sliding movement of the outer core sections on the inner core is provided by a plurality of keylocks which are fixedly secured in corresponding axial keyways in the inner core and which slidably engage corresponding axial keyways in the outer core sections. Coacting cam faces on the keylock and on the keyway of the outer core sections ensure that the outer core sections move firmly and positively into engagement with the inner core as the outer core sections arrive at their expanded molding positions. Means are also disclosed to ensure that the keylock is firmly and positively seated in the keyway in the inner core and further camming means are disclosed to ensure that the lower ends of the outer core sections are held firmly against the inner core during the molding operation.

U.S. Pat. No. 4,618,121 to CONTI, published on Oct. 21, 1986 discloses, amongst other things, a mold for forming a plastic cap and removing a cap from such a mold. The mold comprises female and male members which, together, form a mold cavity in which the cap is formed. The female member includes an upper assembly and a plurality of cams. The cams have radial protrusions engaging the male member to form annular recesses in the cap. The cap is removed from the mold by moving the upper assembly of the female member axially and the cams thereof radially away from the cap, and then removing the cap itself from the male member of the mold. Preferably the cap is shrunk onto the male member to develop a space between the cap and the female member of the mold prior to moving the female member away from the cap.

US Patent Application Publication 2009/0104306 A1 to BEREUTER et al., published on Apr. 23, 2009 discloses, amongst other things, an injection-molding tool for plastics having a tool core, an ejector and a sliding tool portion for forming an undercut, each of which is displaceable, the sliding tool portion being displaceable both in the push-out direction of the plastics molded component produced in the tool and perpendicular to this direction, while the ejector and the tool core are displaceable in the ejection direction and both the travel of the tool core and that of the sliding tool portion are derived from the travel of the ejector.

EP Patent Application Publication 1 905 566 A1 to CARUANA, published on Apr. 2, 2008 discloses, amongst other things, a mould for fabricating sealing caps made from plastics material, for bottles, with a sealing ring connected to each cap by means of a weakening line formed by a plurality of axial stems spaced apart by open circumferential areas, in which the inserts for defining, in the said impression, the open circumferential areas of the said weakening line are formed by portions of devices in the form of curved bodies having a wedge-shaped cross section, positioned within a conical cavity of the annular body of the mould within which they are retained and guided by a plurality of permanent magnets. The movements of the devices and of the insert portions take place within the conical cavity, thus reducing the overall dimensions of the mould.

SUMMARY

According to a first aspect claimed herein, there is provided a molding apparatus, comprising a stripper sleeve for use in a first stack portion of a mold stack, wherein the stripper sleeve is configured to open, in use, a slide pair of the first stack and to strip, in use, a molded from the first stack portion These and other aspects and features will now become apparent to those skilled in the art upon review of the following description of specific non-limiting embodiments in conjunction with the accompanying drawings.

DETAILED DESCRIPTION OF THE DRAWINGS

The detailed description of illustrative (non-limiting) embodiments will be more fully appreciated when taken in conjunction with the accompanying drawings, in which:

FIG. 3A shows the injection mold of FIG. 1 in a mold-closed configuration for molding of a molded article therein;

FIG. 3B shows a first stage in an ejection of the molded article from the injection mold of FIG. 1, wherein the injection mold has been arranged into a mold-open configuration;

FIG. 3C shows a second stage in the ejection of the molded article from the injection mold of FIG. 1, wherein the first stack portion has been re-arranged to move a first slide and a second slide thereof into a first slide clearance position and a second slide clearance position, respectively, with movement of a stripper sleeve towards a stripping position;

FIG. 3D shows a third stage in the ejection of the molded article from the injection mold of FIG. 1, wherein the first stack portion has been further re-arranged to move an outer core relative to an inner core thereof to provide for release of part of the molded article from therebetween.

FIG. 3E shows a final stage in the ejection of the molded article from the injection mold of FIG. 1, wherein the first stack portion has been further re-arranged to move the stripper sleeve into its stripping position and in so doing strip the molded article from the outer core.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF THE NON-LIMITING EMBODIMENT(S)

Figure 1:
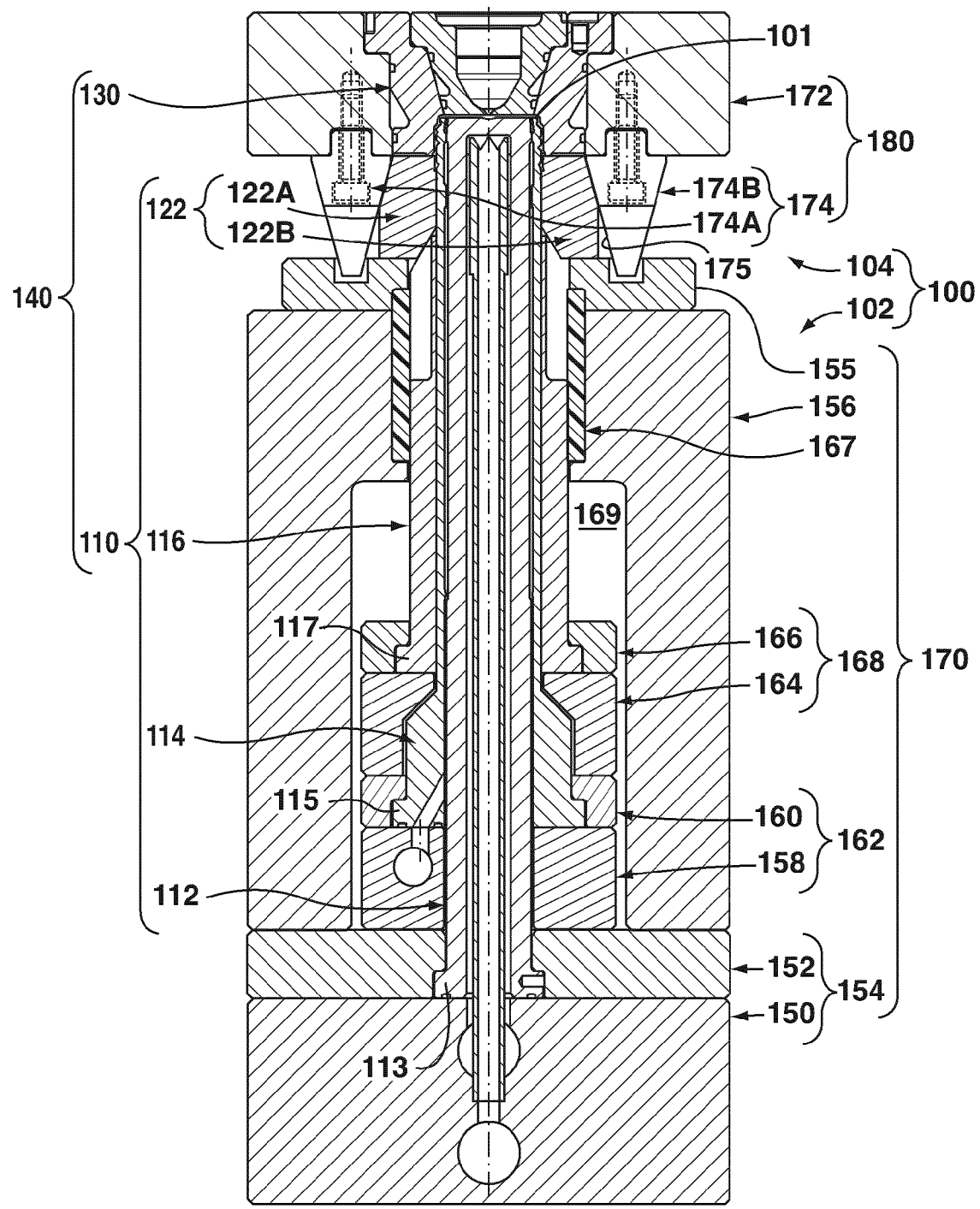
FIG. 1 shows a section view through a portion of a non-limiting embodiment of an injection mold and of a mold stack thereof.

With reference to FIG. 1, there is depicted a section view through a portion of a non-limiting embodiment of a portion of an injection mold 100. The injection mold 100 includes a first mold half 102 and a second mold half 104 that are associated, in use, with platens of an injection molding machine (not shown) for a repositioning thereof between a mold-closed configuration, as shown, and a mold-open configuration (FIG. 3B). In the mold-closed configuration a molding cavity 101 is defined in a mold stack 140 that is associated with the injection mold 100 within which a molded article 106 (FIG. 3E), such as, for example, a closure of a type for capping a bottle, is moldable. In the mold-open configuration a first stack portion 110 and a second stack portion 130 of the mold stack 140, that are associated with the first mold half 102 and the second mold half 104, respectively, are separated to open the molding cavity 101 for a subsequent release of the molded article 106 (FIG. 3E) therefrom.

The non-limiting embodiment of the first mold half 102 broadly includes a first mold shoe 170 with which the first stack portion 110 is associated. More particularly, the first mold shoe 170 provides for coupling, in use, the first stack portion 110 to one of the platens (not shown) of the injection molding machine (not shown), as well as for repositioning members of the first stack portion 110 between a molding configuration and an ejection configuration.

The first stack portion 110 broadly includes an inner core 112, an outer core 114, and a slide pair 122 with which to define an inner portion and an encapsulated portion of the molding cavity 101. The first stack portion 110 also includes a stripper sleeve 116 with which to open the slide pair 122 and to strip the molded article 106 from the outer core 114.

Figure 2:
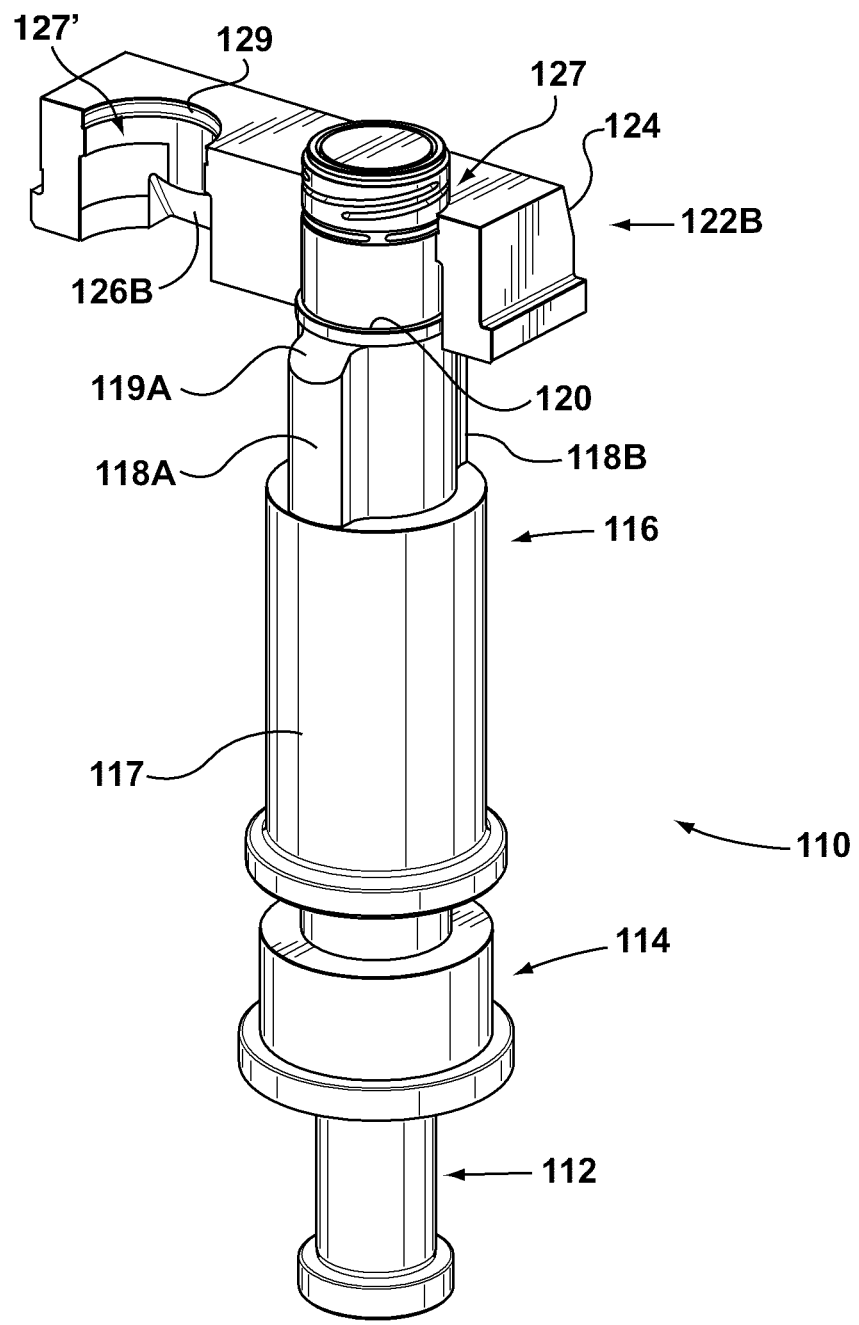
FIG. 2 shows a perspective view of part of a first stack portion of the mold stack of FIG. 1.

As may be further appreciated with further reference to FIG. 2, the inner core 112 has a cylindrical body around which a tubular body of the outer core 114 is slidably arranged to accommodate relative movement thereof, along the mold-stroke axis, whereby a part of the molded article 106 is releasable from therebetween. The inner portion of the molding cavity 101 (FIG. 1) includes an outer surface at a first end of the tubular body, a top face of the cylindrical body, and confronting surfaces therebetween.

The stripper sleeve 116 also has a tubular body that is slidably arranged around the outer core 114 to accommodate a relative movement therebetween, along the mold-stroke axis, whereby the slide pair 122 are openable (FIGS. 3B and 3C) and the molded article 106 (FIG. 3E) is strippable from the outer core 114 (FIGS. 3D and 3E). In the present non-limiting embodiment the stripper sleeve 116 does not define any portion of the molding cavity 101

(FIG. 1). That being said, in another non-limiting embodiment, not shown, the stripper sleeve 116 may have an alternative structure wherein it too defines a portion of the molding cavity in keeping with common practice in the art. Returning to the description of the present non-limiting embodiment, and as shown with reference to FIG. 2, it can be seen that a top annular face on the tubular body of the stripper sleeve 116 defines a molded article engager 120 with which to engage the molded article 106 to cause a stripping thereof from the outer core 114 with movement of the stripper sleeve 116 from a stripper sleeve molding position (FIG. 3A) towards a stripping position (FIG. 3E).

With further reference to FIG. 3B, it can be seen that the stripper sleeve 116 further defines a first opening cam 119A with which to engage, in use, a first opening cam follower 126A that is defined on a first slide 122A of the slide pair 122 to cause lateral opening movement thereof, relative to a second slide 122B of the slide pair 122, from a first slide molding position (FIG. 3A) towards a first slide clearance position (FIG. 3C), with an axial movement of the stripper sleeve 116 from the stripper sleeve molding position (FIG. 3A) towards the stripping position (FIG. 3E). Likewise, the stripper sleeve 116 also defines a second opening cam 119B (FIG. 3B) with which to engage, in use, a second opening cam follower 126B (FIG. 3B) that is defined on the second slide 122B to cause lateral opening movement thereof, relative to the first slide 122A, from a second slide molding position (FIG. 3A) towards a second slide clearance position (FIG. 3C), with movement of the stripper sleeve 116 from the stripper sleeve molding position (FIG. 3A) towards the stripping position (FIG. 3E).

As best illustrated in FIG. 2, the stripper sleeve 116 includes a first protuberance 118A that projects from a sidewall of the tubular body in between the first end thereof and a cylindrical guide portion 117. A first tapered face on the first protuberance 118A provides the first opening cam 119A. Likewise, the tubular body also defines a second protuberance 118B that projects from the sidewall of the tubular body in between the first end thereof and the cylindrical guide portion 117. The second tapered face on the second protuberance 118B provides the second opening cam 119B (not shown). The first protuberance 118A and the second protuberance 118B are located directly opposite each other across the tubular body. That being said, in another non-limiting embodiment, not shown, the first stack portion 110 may include some other number or arrangement of slides, or some other variety of split inserts, each with its own opening cam follower, wherein the number and placement of the corresponding opening cams on the stripper sleeve may correspond therewith. That being said, in another non-limiting embodiment, not shown, the first opening cam 119A may have an alternative structure, such as a frusto-conical face that extends around the tubular body, that is able to cooperate with the opening cam follower of more than one slide such as with those of the first slide 122A and the second slide 122B.

As may have been appreciated already, the first slide 122A and the second slide 122B of the slide pair 122 are configured to define the encapsulated portion of a molding cavity 101 (FIG. 1) in cooperation with the inner core 112 and the outer core 114 when arranged in the first slide molding position and a second slide molding position, respectively. Both the first slide 122A and the second slide 122B are formed from a rectangular bar of material thus defining a bar body. This may be appreciated with reference to FIG. 2 wherein a perspective view of the second slide 122B is shown. The first slide 122A (not shown) has a structure that mirrors that of the second slide 122B. As can be seen, the second slide 122B defines half of a pair of cylindrical passageways 127, 127' therethrough, a remaining half of each of the cylindrical passageways 127, 127' being defined by the first slide 122A, not shown. Each of the cylindrical passageways 127, 127' defines a space through which the first stack portion 110 and a further first stack portion, not shown, are arrangeable. That is, the slide pair 122 (FIG. 1) are configured for use in an injection mold 100 having a plurality of mold stacks, and wherein the slide pair 122 is structured to cooperate with a pair of the plurality of mold stacks. Of course, the particular number of mold stacks with which the slide pair 122 is cooperable is not particularly limited. Returning to the description of the present non-limiting embodiment, it can be further seen that an upper portion 129 of each of the cylindrical passageways 127, 127' defines the encapsulated portion of the molding cavity 101 (FIG. 1) in cooperation with outer core 114. Also shown, is a second opening cam follower 126B that is defined as an outwardly tapering groove that passes through a lower portion of each of the cylindrical passageways 127, 127'. The first opening cam follower 126A (FIG. 3B) is similarly defined on the first slide 122A.

The structure and operation of the components of the first mold shoe 170 will now be described in greater detail.

With reference to FIG. 1, it may be appreciated that the first mold shoe 170 broadly includes a first core retainer 154, a second core retainer 162, and a stripper retainer 168. The inner core 112 is coupled to the first core retainer 154, the outer core 114 is coupled to the second core retainer 162, and the stripper sleeve 116 is coupled to the stripper retainer 168. The first core retainer 154 includes a first core plate 150 with a first clamp plate 152 connected thereto between which is clamped a flange portion of the inner core 112. The second core retainer 162 includes a second core plate 158 with a second clamp plate 160 connected thereto between which is clamped a flange portion of the outer core 114. The stripper retainer 168 includes a stripper plate 164 with a third clamp plate 166 connected thereto between which is clamped a flange portion of the stripper sleeve 116.

The first mold shoe 170 also includes an ejector box 156. The ejector box 156 is coupled to the first core retainer 154 with a space 169 being defined therebetween within which the second core retainer 162 and the stripper retainer 168 are slidably arranged to accommodate repositioning thereof, in use, along the mold-stroke axis, and thereby reposition the outer core 114 and the stripper sleeve 116, respectively, relative to the inner core along the mold-stroke axis. Without limiting the means by which the second core retainer 162 and the stripper retainer 168 may repositioned along the mold-stroke axis, the repositioning may be provided by a two-stage actuator (not shown) that is linked with the ejector of the injection molding machine (not shown). The ejector box 156 further defines a passageway within which a guide bushing 167 is arranged, the guide bushing 167 being configured to guide movements of the stripper sleeve 116 in cooperation with a cylindrical guide portion 117 thereof.

The slide pair 122 is slidably linked with the ejector box 156 in a typical manner. In particular, the slide pair are slidably retained to the ejector box 156 by a pair of gibs (not shown) that are fastened to the ejector box 156 and that cooperate with a pair of guide flanges 125, 125' that are defined on opposite ends of each of the first slide 122A and the second slide 122B. In addition, a wear plate 155 separates the slide pair 122 from the ejector box 156.

Having described the construction of the first mold half 102, the description shall now briefly focus on the second mold half 104. With reference to FIG. 1, it may be appreciated that the second mold half 104 broadly includes a second mold shoe 180 with which the second stack portion 130 is associated. More particularly, the second mold shoe 180 provides for coupling, in use, of the second stack portion 130 to a remaining one of the platens (not shown) of the injection molding machine (not shown).

The second mold shoe 180 includes a cavity plate 172 with a first retaining member 174A associated therewith. The cavity plate 172 is structured to have the second stack portion 130 mounted thereto, and the first retaining member 174A is arranged to be engagable with the first slide 122A on the first mold half 102 with the first mold half 102 and the second mold half 104 arranged in a mold-closed configuration, as shown, to retain the first slide 122A in the first slide molding position. The first retaining member 174A further defines a closing cam 175 with which to engage a closing cam follower on the first slide 122A with relative movement of the first mold half 102 and the second mold half 104 towards the mold-closed configuration. Likewise, the second mold shoe 180 includes a second retaining member 174B associated therewith that is engagable, in use, with the second slide 122B on the first mold half 102 with the first mold half 102 and the second mold half 104 arranged in the mold-closed configuration, as shown, to retain the second slide 122B in the second slide molding position. The second retaining member 174B also defines a closing cam with which to engage a closing cam follower 124 on the second slide 122B with relative movement of the first mold half 102 and the second mold half 104 towards the mold-closed configuration.

Thus having described the structure of the non-limiting embodiment of the injection mold 100, the operation thereof shall now be briefly reviewed.

As shown with reference to FIG. 3A, a typical injection molding cycle involving the injection mold 100 begins with the injection mold 100 being in the mold-closed configuration (i.e. closed and clamped).

Next, molding material is injected into the molding cavity 101, using known structure and steps, to form a molded article 106 (FIG. 3E). The molded article 106 is then solidified, at least partially, in the molding cavity 101 with the application of in-mold cooling, using known structure and steps.

Next, as shown with reference to FIG. 3B, with the molded article 106 having been cooled sufficiently to withstand opening of the injection mold 100 and stripping from the first stack portion 110 without causing a defect therein (i.e. undesired plastic deformation), the injection mold 100 is arranged into the mold-open configuration with relative separating movement of the first mold half 102 and the second mold half 104.

Next, as shown with reference to FIG. 3C, the first stack portion 110 is arranged for the first stage of ejection of the molded article 106 thereon. This step involves moving the stripper sleeve 116 a first distance towards the stripping position, wherein the first opening cam 119A and the second opening cam 119B thereon engage the first opening cam follower 126A and the second opening cam follower 126B on the first slide 122A and the second slide 122B, to move them from the first and second slide molding positions (FIG. 3B) to the first and second slide clearance positions, respectively.

Next, as shown with reference to FIG. 3D, the first stack portion 110 is arranged for a third stage of ejection of the molded article 106 thereon. This step involves moving the stripper sleeve 116 a further distance towards the stripping position with the molded article engager 120 thereon being in contact with a bottom surface of the molded article 106. During this stage, the outer core 114 is moved in tandem with the stripper sleeve 116, wherein the outer core 114 is moved relative to the inner core 112 to release the part (e.g. plug seal) of the molded article (e.g. closure) that was encapsulated therebetween.

Lastly, as shown with reference to FIG. 3E, the first stack portion 110 is arranged for a final stage of ejection of the molded article 106 thereon. This step involves moving the stripper sleeve 116 a final distance to the stripping position, with the outer core 114 held stationary, whereby the molded article 106 is stripped from contact with the outer core 114, by virtue of being pushed therefrom through engagement with the molded article engager 120 on the stripper sleeve 116.

It is noted that the foregoing has outlined some of the more pertinent non-limiting embodiments. These non-limiting embodiments may be used for many applications. Thus, although the description is made for particular arrangements and methods, the intent and concept of these non-limiting embodiments may be suitable and applicable to other arrangements and applications. It will be clear to those skilled in the art that modifications to the disclosed non-limiting embodiments can be effected. The described non-limiting embodiments ought to be construed to be merely illustrative of some of the more prominent features and applications thereof. Other beneficial results can be realized by applying these non-limiting embodiments in a different manner or modifying them in ways known to those familiar with the art. This includes the mixing and matching of features, elements and/or functions between various non-limiting embodiments is expressly contemplated herein, unless described otherwise, above.

What is claimed is:

1. A molding apparatus, comprising:
a stripper sleeve (116) for use in a first stack portion (110) of a mold stack (140), wherein the stripper sleeve (116) is configured to open, in use, a slide pair (122) of the first stack portion (110) and to strip, in use, a molded article (106) from the first stack portion (110);
the stripper sleeve (116) includes a molded article engager (120) with which to engage, in use, the molded article (106) to cause a stripping thereof from the first stack portion(110) with movement of the stripper sleeve (116) from a stripper sleeve molding portion towards a stripping position; and
the stripper sleeve (116) further includes a first opening cam (119A) with which to engage, in use, a first opening cam follower (126A) that is defined on a first slide (122A) of the first stack portion (110) to cause lateral opening movement thereof, relative to a second slide (122B) of the first stack portion (110), from a first slide molding position towards a first slide clearance position, with an axial movement of the stripper sleeve (116) from the stripper sleeve mold position towards the stripping position.

2. The molding apparatus of claim 1, wherein:
the first opening cam (119A) is further configured to engage, in use, a second opening cam follower (126B) that is defined on the second slide (122B) to cause lateral opening movement thereof, relative to the first slide (122A), from a second slide molding position towards a second slide clearance position, with the axial movement of the stripper sleeve (116) from the stripper sleeve molding position towards the stripping position.

3. The molding apparatus of claim 1, wherein:
the stripper sleeve (116) has a tubular body that defines:
the molded article engager (120) on a top annular face at a first end thereof;
a first protuberance (118A) that projects from a sidewall of the tubular body in between the first end thereof and a cylindrical guide portion (117), and wherein a first tapered face on the first protuberance (118A) provides the first opening cam (119A).

4. The molding apparatus of claim 3, wherein:
the stripper sleeve (116) further defines a second opening cam (119B) with which to engage, in use, a second opening cam follower (126B) that is defined on the second slide (122B) to cause lateral opening movement thereof, relative to the first slide (122A), from the second slide molding position towards the second slide clearance position, with movement of the stripper sleeve (116) from the stripper sleeve molding position towards the stripping position;
wherein the tubular body defines a second protuberance (118B) that projects from the sidewall of the tubular body in between the first end thereof and the cylindrical guide portion (117), and wherein a second tapered face on the second protuberance (118B) provides the second opening cam (119B).

5. The molding apparatus of claim 4, wherein:
the first protuberance (118A) and the second protuberance (118B) are located directly opposite each other across the tubular body.

6. The molding apparatus of claim 4, further comprising:
the first slide (122A) and the second slide (122B) of the first stack portion (110).

7. The molding apparatus of claim 6, wherein:
the first slide (122A) and the second slide (122B) of the first stack portion (110) are configured to define an encapsulated portion of a molding cavity (101) when arranged in the first slide molding position and the second slide molding position, respectively.

8. The molding apparatus of claim 7, further comprising:
an inner core (112) and an outer core (114) of the first stack portion (110) with which to define an inner portion of the molding cavity (101);
the outer core (114) being slidably arranged around the inner core (112) to accommodate relative movement thereof to provide for release of part of the molded article (106) from therebetween.

9. The molding apparatus of claim 8, wherein:
the stripper sleeve (116) is slidably arranged around the outer core (114) to accommodate relative movement thereof to provide for stripping of the molded article (106) from the outer core (114).

10. The molding apparatus of claim 9, further comprising:
a first mold shoe (170) for coupling, in use, the first stack portion (110) to an injection molding machine, wherein the first mold shoe (170) includes a first core retainer (154), a second core retainer (162), a stripper retainer (168), and an ejector box (156);
wherein the inner core (112) is coupled to the first core retainer (154), the outer core (114) is coupled to the second core retainer (162), and the stripper sleeve (116) is coupled to the stripper retainer (168);
the ejector box (156) is coupled to the first core retainer (154) with a space (169) being defined therebetween within which the second core retainer (162) and the stripper retainer (168) are slidably arranged to accommodate repositioning thereof, and thereby reposition the outer core (114) and the stripper sleeve (116), respectively, relative to the inner core (112).

11. The molding apparatus of claim 10, wherein:
the first slide (122A) and the second slide (122B) are slidably linked with the ejector box (156).

12. The molding apparatus of claim 11, wherein:
the first mold shoe (170) and the first stack portion (110) cooperate to provide a first mold half (102) of an injection mold (100).

13. The molding apparatus of claim 12, further comprising:
a second mold half (104) of the injection mold (100), wherein the second mold half (104) includes a second stack portion (130) of the mold stack (140) and a second mold shoe (180) for coupling, in use, the second stack portion (130) to the injection molding machine.

14. The molding apparatus of claim 13, wherein:
the second mold shoe (180) includes a cavity plate (172) with a first retaining member (174A) associated therewith;
wherein the cavity plate (172) is structured to have the second stack portion (130) mounted thereto, and the first retaining member (174A) is arranged to be engagable with the first slide (122A) on the first mold half (102) with the first mold half (102) and the second mold half (104) arranged in a mold-closed configuration to retain the first slide (122A) in the first slide molding position.

15. The molding apparatus of claim 14, wherein:
the first retaining member (174A) defines a closing cam (175) with which to engage a closing cam follower (124) on the first slide (122A) with relative movement of the first mold half (102) and the second mold half (104) towards the mold-closed configuration.

16. The molding apparatus of claim 14, wherein:
the second mold shoe (180) includes a second retaining member (174B) associated therewith that is engagable, in use, with the second slide (122B) on the first mold half (102) with the first mold half (102) and the second mold half (104) arranged in the mold-closed configuration to retain the second slide (122B) in the second slide molding position.

17. The molding apparatus of claim 16, wherein:
the second retaining member (174B) defines a closing cam with which to engage a closing cam follower on the second slide (122B) with relative movement of the first mold half (102) and the second mold half (104) towards the mold-closed configuration.

18. The molding apparatus of claim 1, wherein:
the molded article (106) is a closure of a type for capping a bottle.

* * * * *